United States Patent [19]

Lanser et al.

[11] Patent Number: 5,283,696
[45] Date of Patent: Feb. 1, 1994

[54] SHATTER RESISTANT MIRROR

[75] Inventors: Michael L. Lanser; Paul T. Vander Kuyl, both of Holland, Mich.

[73] Assignee: Prince Corporation, Holland, Mich.

[21] Appl. No.: 788,935

[22] Filed: Nov. 7, 1991

[51] Int. Cl.$^5$ .......................... G02B 5/08; G02B 7/182
[52] U.S. Cl. .................................. 359/870; 359/883
[58] Field of Search ........................ 359/870, 883, 884

[56] References Cited

U.S. PATENT DOCUMENTS

| | | | |
|---|---|---|---|
| 3,427,096 | 2/1969 | Dykema et al. | 359/870 |
| 3,619,038 | 11/1971 | Underhill | 156/500 |
| 3,776,618 | 12/1973 | Perison, Sr. | 359/870 |
| 3,843,236 | 10/1974 | Kurz, Jr. | 359/870 |
| 3,926,470 | 12/1975 | Marcus . | |
| 3,985,429 | 10/1976 | Fleischer | 359/870 |
| 4,000,404 | 12/1976 | Marcus . | |
| 4,227,242 | 10/1980 | Marcus | 362/74 |
| 4,229,077 | 10/1980 | Schwab | 359/883 |
| 4,452,022 | 6/1984 | Bezborodko | 52/416 |
| 4,492,430 | 1/1985 | Morris et al. . | |
| 4,988,180 | 1/1991 | Gabas | 359/883 |
| 5,007,532 | 4/1991 | Binish . | |

*Primary Examiner*—Bruce Y. Arnold
*Assistant Examiner*—Darryl Collins
*Attorney, Agent, or Firm*—Price, Heneveld, Cooper, DeWitt & Litton

[57] ABSTRACT

A shatter resistant mirror includes a frangible mirror material for reflecting an image which has a coating of an elastic adhesive material which bonds a rigid backing material to the frangible mirror body. In a preferred embodiment of the invention, the adhesive was one of a water-based synthetic polymeric material or a hot melt pressure sensitive adhesive. The rigid support member preferably is a fiberboard material. In some embodiments of the invention, the composite mirror structure includes multiple layers of composite fiberboard material to provide spacing for mounting the mirror in a particular application.

25 Claims, 1 Drawing Sheet

SHATTER RESISTANT MIRROR

BACKGROUND OF THE INVENTION

The present invention pertains to a mirror construction for automotive interior applications such as vanity mirror visors and particularly to a shatter resistant construction for such mirrors.

For several years, visors have included vanity mirrors for the personal grooming of passengers. Some vanity mirrors include illumination means for use under low ambient light conditions such as disclosed in U.S. Pat. No. 4,000,404. In many instances, the vanity mirrors include a cover which covers the vanity mirror when not in use such that the driver is not distracted by reflections from the mirror. Also, when covered, the mirror poses no safety hazard in the event of an accident.

Vehicle mirrors such as visor vanity mirrors, rearview mirrors and the like must meet minimum safety standards for vehicles in the United States and in the European Economic Community (EEC). One standard for the EEC includes that glass shards from a broken mirror must remain on a mirror backing and there be no greater than a 0.010 inch step between adjacent glass shards in the event a mirror is broken during impact. Presently, existing mirror backing materials for glass mirrors do not meet these standards. European vehicles frequently use metal mirrors which are very costly and provide relatively poor images in order to meet such standards. Plastic mirrors also can meet the standards but they are too costly, provide a relatively poor image and are subject to warping under temperature extremes. Some glass mirrors have been covered with a mylar protective film which, however, is very costly and presents a surface subject to scratching with use. Efforts have been made to provide a polypropylene visor core which supports the mirror sufficiently to eliminate breaking. However, adding significant additional weight and material cost to a visor is a commercially unattractive option.

Backing materials which have been used in an effort to meet United States impact standards have included paper with an adhesive layer, mylar tape, masking tape, polyethylene foam adhered to the mirror back and finally latex film which has been adhered to the mirror back. One visor patent suggests a combination of a polyurethene foam material and a backing plate (U.S. Pat. No. 3,926,470). Although these existing backing materials for glass mirrors retain mirror shards on the backing material, they have not proven effective in meeting newer safety requirements nor have they been resistant in preventing shattering of the mirror in the first instance.

SUMMARY OF THE INVENTION

Accordingly, there is a need for a commercially feasible mirror structure which passes or exceeds all vehicle safety standards and provides excellent optical imaging. While attempting to overcome the shard retention problem by eliminating steps between adjacent mirror shards of 0.010 inches or less, the development of the present invention serendipitously and unexpectedly resulted in a mirror with vastly improved shatter resistance. Mirror construction using the present invention includes a resilient adhesive material for bonding a stiff continuous planar support to the rear surface of a mirror. Mirrors using such construction are surprisingly resistant to breakage, but if broken, the resultant fractured mirror retains shards within prescribed standards. Thus, while developing a mirror construction which would retain shards with a necessary topological configuration, the resultant construction was unexpectantly found to be highly resistant to mirror breakage.

Composite mirror constructions embodying the present invention include a frangible mirror material for reflecting an image. An elastic adhesive material bonds a rigid planar backing material to a substantial portion of the rear surface of the mirror. In a preferred embodiment of the invention, the adhesive was one of a water-based synthetic polymeric material or a hot melt pressure sensitive material. The planar rigid support member preferably is a fiberboard material. In some embodiments of the invention, the composite mirror structure includes multiple layers of composite fiberboard material to provide spacing for mounting the mirror in a particular application.

Such mirror construction can be used for vanity mirrors for use in visors, rearview mirrors or other applications where shatter resistant mirrors are desirable. The resultant structure of this invention provides a high-quality mirror image by employing a conventional silver-backed glass mirror and one which is relatively inexpensive to manufacture and which exceeds current test specifications both in the United States and in the European Economic Community for vehicle interior mirrors. These and other features, objects and advantages of the present invention will become apparent upon reading the following description thereof together with reference to the accompanying drawings in which:

DETAILED DESCRIPTION OF THE PREFERRED EMBODIMENT

Figure 1:
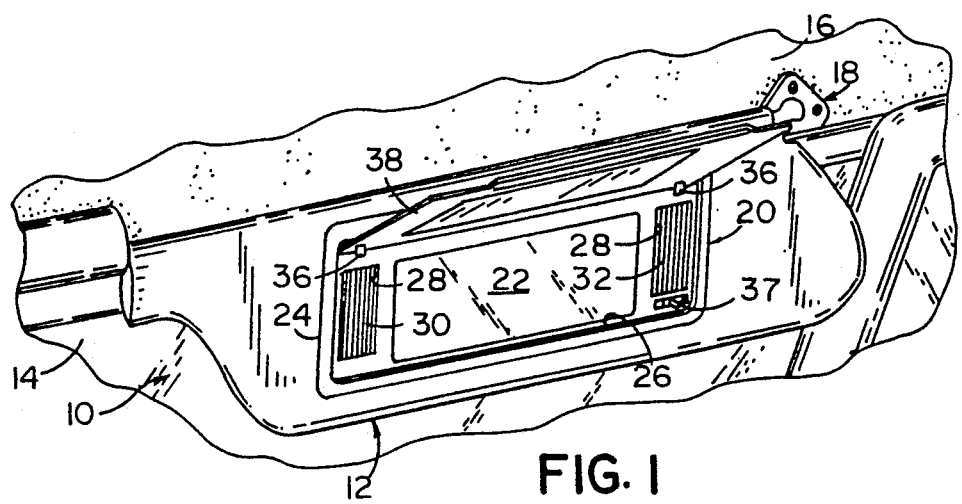
FIG. 1 is a perspective view of an illuminated vanity mirror visor incorporating the mirror of the present invention.

Referring initially to FIG. 1 there is shown a vehicle 10 such as an automobile in which an illuminated vanity mirror visor 12 is installed. The visor is mounted above the vehicle windshield 14 to the roof 16 of the vehicle by means of a elbow bracket assembly 18 of conventional design. The passenger side visor shown is in a lowered use position and includes an illuminated vanity mirror assembly 20 having a composite mirror 22 embodying the present invention. The mirror is mounted to a mirror frame 24 which includes a recess 26 behind which the mirror is positioned. On either side of the mirror 22 and mounted within recesses 28 are light directing lenses 30 and 32 behind which are positioned lamps for providing illumination to the face of the user in low ambient light conditions. Pivotally mounted to the mirror frame 24 by means of a pair of hinges 36, is a cover 38 which moves between an open position exposing the mirror for use, as illustrated in FIG. 1, to a closed position covering the mirror and lights. The illumination level may be controlled by a dimming switch such as switch 37 located in the mirror frame below lens 32 for changing the light intensity. The visor can have a core construction either of polypropylene as disclosed in U.S. Pat. No. 3,926,470 or a fiberboard construction such as disclosed in U.S. Pat. No. 5,007,532.

Figure 4:
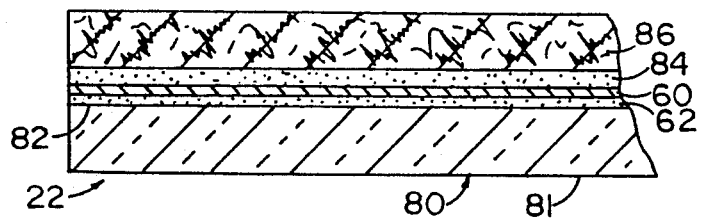
FIG. 4 is an enlarged fragmentary cross-sectional view of the edge of yet another embodiment of the present invention.
Figure 5:
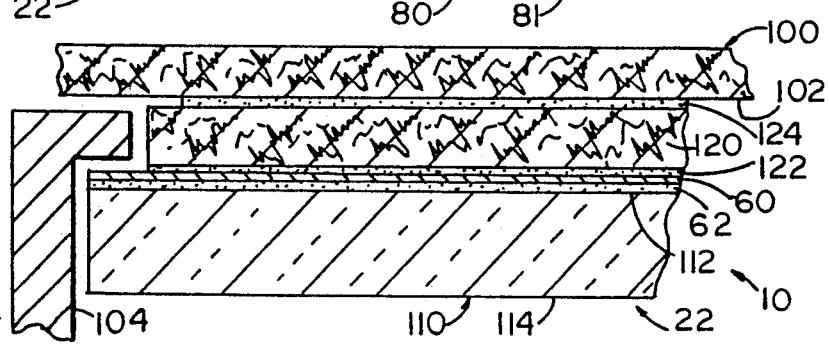
FIG. 5 is an enlarged fragmentary cross-sectional view of the edge of still a further embodiment of the present invention.

The mirror 22 may be attached to the mirror frame 24 and the entire assembly mounted to a visor core or in some embodiments, and particularly the embodiment shown in FIG. 5, using a core of the type disclosed in the above noted U.S. Pat. No. 5,007,532; the mirror can be mounted directly to the visor core. The unique composite mirror and backing construction is now described in detail in connection with the different embodiments shown in FIGS. 2–5.

Figure 2:
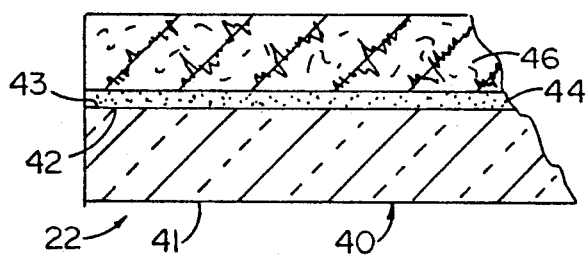
FIG. 2 is an enlarged fragmentary cross-sectional view of the edge of the mirror shown in FIG. 1.

In FIG. 2, a cross-sectional view of the edge of mirror 22 is shown and includes a glass mirror body 40 having a silvered rear surface 42. The front surface 41 of the mirror faces outwardly toward the face of the user. The mirror can have a thickness from about 0.060 to about 0.085 inches and has its external rear surface 43 coated with an elastic adhesive material 44 of a thickness from about 0.004 inches to about 0.010 inches. The adhesive material is preferably an elastomeric adhesive which bonds a fiberboard planar backing member 46 to the rear surface 43 of mirror 40. The planar fiberboard member 46 has a preferred thickness of from about 0.040 inches to about 0.100 inches and has a density of from about 320# to about 400# per 1000 sq. ft. for a thickness of 0.100 inches. When composite fiberboard such as VALDOR material described below in connection with the alternative embodiments is used, the density of such material was from about 290# to 320# per 1000 ft. sq. for a material having a thickness of 0.080 inches. Naturally, denser materials will also function as a stiff backing material but would not be as cost effective as the preferred fiberboard.

The adhesives which have been successfully employed in connection with such mirror construction to surpass automotive standards for safety for such mirrors in the preferred embodiment include a water-based adhesive which was non-pressure sensitive and coated on the rear surface 43 using a roll-coating process. The preferred adhesive was a water-based vinyl acetate such as Model No. 7112-582 available from Findley Adhesives, Inc. of Wauwatosa, Wis. The elastomeric properties of this adhesive make it ideal for bonding the planar stiff backing fiberboard material 46 to the rear surface 43 of the mirror 40. Other elastomeric adhesives such as hot melt pressure sensitive adhesives can also be employed. Two which have been successfully employed are Models H2038A and H2114-01 also commercially available from Findley Adhesives, Inc. The hot melt adhesives are applied to the rear surface 43 of mirror 22 using a slot extrusion process in which the mirror is passed over the slot through which the hot melt adhesive is extruded and the fiberboard backing member 46 subsequently pressed onto the adhesive before it sets. Again the strength and elasticity of these adhesives makes them ideal for the application shown in FIGS. 1 and 2. Other water-based adhesives such as Findley Model 125-858 and L3529 have also been successfully employed. One other water-based adhesive has also been successfully applied by coating both the back of the mirror and a facing surface of the backing member 46 and joining the two. Such adhesive was Model No. 211-939 also available from Findley Adhesives, Inc. Generally, an elastomeric adhesive has a strength and deflection characteristic desired for the present application.

In all of the examples, the layer of adhesive was thin enough to provide transmission of impact forces on a front surface 41 of mirror 40 to the stiff backing material 46 and thick and strong enough to provide a secure bond between the fiberboard and the mirror. The resultant mirror construction withstood standard mirror tests in which a 15 pound 6 inch headform impacting against the mirror at a velocity of 15 miles per hour did not break the mirror. In fact it was discovered that light to medium hammer blows do not fracture mirrors constructed according to the present invention. When subjected to forces sufficient to break the mirrors, the shards of glass were securely held by the adhesive without exceeding the 0.010 inch step between adjacent mirror shards. Other embodiments of the invention employing planar relatively stiff fiberboard backing plates for the mirror can also be employed. These are now described in connection with the following FIGS. 3–5.

Figure 3:
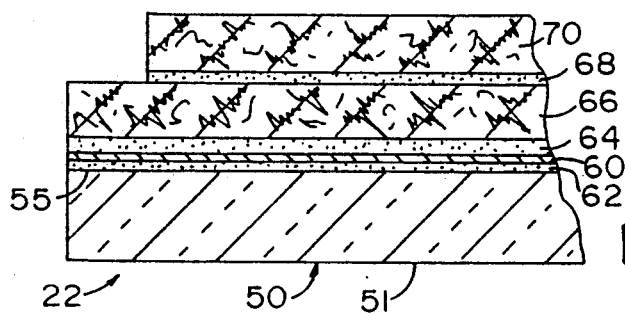
FIG. 3 is an enlarged fragmentary cross-sectional view of the edge of an alternative embodiment of the mirror.

Referring now to FIG. 3, there is shown another embodiment of the present invention in which a mirror assembly 22 having a mirror 50 of the same general construction as mirror 40 is included. Mirror 50 includes a silvered rear surface 55 and an outwardly facing front surface 51. The back of rear surface 55 which is silvered is covered with a pressure sensitive adhesive paper tape including a paper layer 60 with a pressure sensitive backing adhesive 62. Construction of a mirror with a backing of pressure sensitive paper tape is conventional and has been used in the past. Mirrors with such paper tape can be purchased commercially from Daniel Mirrors and the tape is known as Mac-Tac DMV 900 tape. It provides shard retention only and not shard retention which passes the safety standards currently in effect in the European Economic Community. The surface of paper tape layer 60 opposite mirror 50 is coated with a layer of polyvinyl acetate water-based adhesive 64 such as Model No. 460-500 available from Findley Adhesives, Inc. Bonded to the back of paper layer 60 using adhesive 64 is a 0.040 thick planar composite fiberboard member 66 constituting a laminate of kraft paper, a polyethylene film, and fiberboard. This material is sold under the trademark VALDOR by Fiber Converters of Three Rivers, Mich. The 460-500 adhesive is too brittle for use in the FIG. 2 embodiment, however, in view of the elastomeric adhesive layer 62 and paper 60, it provides an inexpensive and successfully used adhesive in connection with the backing panel 66.

On the side of the composite board 66 opposite adhesive layer 64 is another layer 68 of polyvinyl acetate adhesive having the same characteristics as layer 64 and which bonds a second fiberboard panel 70 to panel 68. As seen by the edge view of the mirror assembly 22 of FIG. 3, panel 70 is somewhat smaller than panel 66 and defines a step out 72 around the periphery of the generally rectangular mirrors to allow the mirror to be held in position utilizing heat stakes in the polymeric mirror frame 24 such as that shown in the FIG. 1 embodiment. Panel 70 has a thickness of approximately 0.080 inches and also is made of VALDOR material. The composite mirror structure 22 of FIG. 3 provides a mirror construction which allows the mirror to be clamped in the mirror frame using heat staked terminals as is conventional and provide the shatter resistant and shard retention properties provided by the embodiment shown in FIG. 2.

FIG. 4 shows yet another embodiment of the present invention in which a mirror assembly 22 includes a glass mirror 80 having a silvered inner rear surface 82 and a front surface 81. The paper tape 60 with adhesive backing 62 of the same type used in the FIG. 3 embodiment (Mac-Tac DMV 900) is applied to the rear surface 82 of mirror 80. Behind the mirror and paper layer 60 is a layer of roll coated water-based polyvinyl acetate non-pressure sensitive adhesive 84 which bonds a VALDOR stiffening backing board 86 to the rear of the mirror 80. Board 86 can have a thickness of about 0.040 inches and the bonding of the board to paper 60 using adhesive 84 and subsequently to mirror 81 using adhesive 62 as part of the Mac-Tac paper tape provides the desired shatter resistance and shard retention characteristics. The composite mirror construction 22 of FIG. 4 can be employed in a variety of applications including an illuminated vanity mirror visor, a rearview mirror or other interior vehicle applications.

In the embodiment shown in FIG. 5, a mirror assembly 22 is mounted directly to the rear surface of a visor core member 100 which is made of a fiberboard material such as VALDOR as disclosed in U.S. Pat. No. 5,007,532 the disclosure of which is incorporated herein by reference. Visor 100 has a rear panel with a forwardly facing surface 102 and a sliding mirror cover 104 with a generally L-shaped end 106 extending into a slot 108 behind a glass mirror 110. Mirror 110 has a silvered rear surface 112 and a forward facing surface 114 which faces outwardly to an opening in the forward wall (not shown) of visor 10. Mirror 110 is of the same construction as previous mirrors having a thickness of from about 0.060 to 0.085 inches. The rear surface of the mirror is covered by a combination of paper tape 60 and adhesive 62 identical to that of the FIGS. 3 and 4 embodiments and a 0.080 thick rigid VALDOR fiberboard backing 120 bonded to the tape 60 using the water-based polyvinyl acetate non-pressure sensitive adhesive 122. Adhesive 122 can be the Findley type 460-500 which bonds the backing material 120 to the back of the mirror assembly 22. Member 120 serves as a spacer and coupling member for mounting mirror 110 to the front surface 102 of visor panel 100. Member 120 is secured to the surface 102 by one of the above identified hot melt adhesives 124. This positions the mirror within the visor while member 120 substantially covers the entire rear surface of the mirror with the exception of slot 108 to which the sliding cover extends for covering the mirror when not in use. For such purpose, the slot 108 may have a depth of approximately ⅜ of an inch at the top and bottom edges of the mirror to allow the cover to slide between an open position exposing the mirror and a closed position covering the mirror as is known in prior visor constructions.

Typically, a mirror assembly 22 for use in a visor, for example, will have a mirror with a height of approximately 3 inches and a width of from 5 to 6 inches although the exact mirror size will vary depending on the visor into which the mirror assembly is mounted. In all the embodiments, the back of the mirror is coated with an elastomeric adhesive and subsequently bonded to a stiff backing member with the elasticity of the adhesive transmitting impact forces to the stiff backing member which prevents excessive flexing of the mirror thereby providing shatter resistance. The adhesive is selected to be sufficiently elastic to provide limited and controlled flexing of the mirror but not enough flexing to allow shattering of the mirror. Unexpectedly, bonding of the fiberboard to the stiff backing such as a fiberboard backing shown in the various embodiments provides a high degree of shatter resistance and yet in the event a mirror is struck with sufficient force to crush the mirror, the elastic adhesive provides the desired shard retention which passes both United States and European safety requirements.

A variety of different types of relatively elastic adhesives can be employed successfully with the structure of the present invention as well as a variety of backing members. For cost purposes, fiberboard is the most efficient material with the desired characteristics, however, other backing materials which are stiffly resistant to flexing can likewise be bonded to the rear surface of the mirror with successful results. These and other modifications to the preferred embodiments of the invention as described herein can be made by those skilled in the art without departing from the spirit or scope thereof as defined by the appended claims.

The embodiments of the invention in which an exclusive property or privilege is claimed are defined as follows:

1. A mirror assembly for use in a vehicle interior comprising:
   a frangible glass mirror having a reflective rear surface;
   a stiff planar backing member having a shape to substantially cover the rear surface of said mirror; and
   an elastomeric adhesive bonding said backing member to said rear surface of said mirror, said adhesive being selected to be sufficiently elastic, glass retentive, and thick to provide limited and controlled flexing of said mirror when subjected to flexing forces, and when subjected to forces sufficient to break said mirror the resulting shards of glass will be securely held by said adhesive without exceeding a 0.010 inch step between adjacent mirror shards.

2. The mirror assembly as defined in claim 1 wherein said backing member is made of fiberboard.

3. The mirror assembly as defined in claim 2 wherein said adhesive is a water-based vinyl acetate.

4. The mirror assembly as defined in claim 2 wherein said adhesive is a hot melt glue.

5. The mirror assembly as defined in claim 1 wherein said backing comprises a pair of composite fiberboard members bonded together.

6. The mirror assembly as defined in claim 5 wherein said pair of composite fiberboard members are bonded together with a polyvinyl acetate adhesive.

7. The mirror assembly as defined in claim 6 wherein the composite fiberboard member remote from said mirror is smaller than the member adjacent said mirror to define a step adjacent at least one edge of said mirror.

8. The mirror assembly as defined in claim 1 wherein said backing member is made of a fiberboard material having a thickness of from about 0.040 inches to about 0.100 inches.

9. The mirror assembly as defined in claim 8 wherein said fiberboard material has a density of at least about 320# for 1000 sq. ft. of material having a thickness of 0.100 inches.

10. The mirror assembly as defined in claim 1 wherein said adhesive has a thickness of from about 0.004 inches to about 0.010 inches.

11. The mirror assembly as defined in claim 1 wherein said adhesive has a thickness of from about 0.004 inches to about 0.010 inches.

12. The mirror assembly as defined in claim 11 wherein said backing member is made of a fiberboard material having a thickness of from about 0.040 inches to about 0.100 inches.

13. The mirror assembly as defined in claim 12 wherein said fiberboard material has a density of at least about 320# for 1000 sq. ft. of material having a thickness of 0.100 inches.

14. A vehicle visor comprising:
a visor body;
a composite vanity mirror including a glass mirror and stiff backing member bonded to said mirror by an elastomeric adhesive; said adhesive being selected to be sufficiently elastic glass retentive and thick to provide limited and controlled flexing of said mirror, said adhesive having sufficient glass retaining force when subjected to forces sufficient to break said mirror, the resulting shards of glass will be securely held by said adhesive without exceeding a 0.010 inch step between adjacent mirror shards; and
means for mounting said visor body to a vehicle.

15. The mirror assembly as defined in claim 14 wherein said adhesive has a thickness of from about 0.004 inches to about 0.010 inches.

16. The mirror assembly as defined in claim 15 wherein said backing member is made of a fiberboard material having a thickness of from about 0.040 inches to about 0.100 inches.

17. The mirror assembly as defined in claim 16 wherein 320# said fiberboard material has a density of at least about for 1000 sq. ft. of material having a thickness of 0.100 inches.

18. The mirror assembly as defined in claim 14 wherein said adhesive is a water-based vinyl acetate.

19. The mirror assembly as defined in claim 14 wherein said adhesive is a hot melt glue.

20. A vehicle accessory including a composite shatter resistant mirror comprising:
an accessory body for mounting within a vehicle, said body including means for mounting a mirror thereto;
a frangible mirror including an outwardly facing front surface and a rear surface;
a planar stiffening member shaped to cover a substantial portion of the rear surface of said mirror, said stiffening member having a thickness of from about 0.040 inches to about 0.100 inches; and
an elastomeric adhesive bonding said stiffening member to said rear surface of said mirror, said adhesive having a thickness of about from 0.004 inches to about 0.010 inches; and
said adhesive being selected to be sufficiently elastic and glass retentive to provide limited and controlled flexing of said mirror when subjected to flexing forces and, when subjected to forces sufficient to break said mirror, the resultant shards of glass will be securely held by said adhesive without exceeding a 0.010 inch step between adjacent mirror shards.

21. The apparatus as defined in claim 20 wherein said stiffener member is made of a fiberboard material.

22. The apparatus as defined in claim 21 wherein said stiffener member includes a laminate of multiple layers of fiberboard material.

23. The apparatus as defined in claim 20 wherein said adhesive is a water-based vinyl acetate.

24. The apparatus as defined in claim 20 wherein said adhesive is a hot melt glue.

25. The apparatus as defined in claim 20 wherein said accessory is a visor.

* * * * *

UNITED STATES PATENT AND TRADEMARK OFFICE
CERTIFICATE OF CORRECTION

PATENT NO. : 5,283,696
DATED : February 1, 1994
INVENTOR(S) : Lanser et al

It is certified that error appears in the above-indentified patent and that said Letters Patent is hereby corrected as shown below:

Column 4, line 62
    "step out" should be --step cut--;

Column 7, line 37
    After "wherein" delete --320#--;

Column 7, line 38
    After "about" insert --320#--;

Signed and Sealed this

Thirteenth Day of September, 1994

Attest:

BRUCE LEHMAN

*Attesting Officer*      *Commissioner of Patents and Trademarks*